United States Patent [19]

Gadessaud

[11] 4,157,423

[45] Jun. 5, 1979

[54] BATTERY CONTAINING AN ALKALINE ELECTROLYTE

[75] Inventor: Robert Gadessaud, Massy, France

[73] Assignee: Compagnie Generale d'Electricite, Paris, France

[21] Appl. No.: 843,105

[22] Filed: Oct. 18, 1977

Related U.S. Application Data

[63] Continuation of Ser. No. 316,199, Dec. 18, 1972, Pat. No. 4,086,405.

[30] Foreign Application Priority Data

| Dec. 16, 1971 | [FR] | France | 71 45268 |
| Feb. 18, 1972 | [FR] | France | 72 05561 |
| Aug. 4, 1972 | [FR] | France | 72 28255 |
| Aug. 10, 1972 | [FR] | France | 72 28943 |
| Aug. 8, 1972 | [FR] | France | 72 28595 |
| Aug. 10, 1972 | [FR] | France | 72 28944 |

[51] Int. Cl.² ............................................. H01M 2/14

[52] U.S. Cl. ................................. 429/206; 429/249; 429/253

[58] Field of Search ............... 429/249, 253, 247, 206, 429/222, 223, 229–231, 254; 526/7, 9, 10

[56] References Cited

U.S. PATENT DOCUMENTS

| 2,635,127 | 4/1953 | Yardney et al. | 429/139 |
| 3,232,916 | 2/1966 | Fogle | 429/254 X |

Primary Examiner—Anthony Skapars
Attorney, Agent, or Firm—Sughrue, Rothwell, Mion, Zinn and Macpeak

[57] ABSTRACT

A battery containing an alkaline electrolyte, having within a container, said electrolyte and two electrodes-separated by a separator; said separator being made of a partially reticulated polyvinyl acetal polyvinyl alcohol; preferably an aromatic aldehyde, which may also have at least one hydroxyl radical, being used together with formaldehyde.

9 Claims, 2 Drawing Figures

BATTERY CONTAINING AN ALKALINE ELECTROLYTE

This application is a continuation of application Ser. No. 316,199, filed Dec. 18, 1972, now U.S. Pat. No. 4,086,405.

BACKGROUND OF THE INVENTION

1. Field of the Invention

The present invention relates to batteries containing an alkaline electrolyte, hereinafter referred to as alkaline batteries, in which the negative electrode is constituted of either zinc or cadmium and the positive electrode of either silver oxide or nickel.

2. Prior Art

Of the different materials suitable for use in an electrochemical cell, zinc would seem particularly attractive, owing to its high energy capacity and low cost. However, two disadvantages arise after a number of charging and discharging cycles, using the zinc electrode in an alkaline electrolyte. Firstly, there is a decantation of the reaction products as a result of the formation, during the discharge process, of complex soluble anions, known as zincate ions, which accumulate at the bottom of the battery owing to the force of gravity. During the recharging period, a deposit tends to accumulate at the lower part of the electrode and hydrogen is given off at the upper part. During successive cycles, the zinc accumulates at the lower part of the electrode to the detriment of the upper part of the electrode. This disadvantage may be partially eliminated by using a separator, i.e., a membrane permeable to the electrolyte and impermeable to the zincate ions. This membrane is situated between the electrodes.

Secondly, during the recharging process, the zinc deposited on the negative electrode tends to form points, known as dendrites. This leads to the perforation of the separator and causes the battery to short-circuit.

In the case of cadmium-nickel batteries, a troublesome phenomenon tends to occur — oxygen is given off at the positive electrode. This discharge of oxygen stops the charging of the negative electrode due to the oxygen migrating towards it.

As a result, the chances of recharging the battery are considerably reduced after a relatively short period of time.

In the case of batteries containing a zinc electrode, the above-mentioned disadvantages may be eliminated by using a separator, which is selective with respect to the zincate ions and which responds satisfactorily both mechanically and chemically. It is important that the separator should be sufficiently reliable and that it should not be affected by the inevitable presence of oxygen on the positive electrode (silver oxide or nickel electrode) at the end of the recharging process.

At present, the most commonly used separator is cellophane. This material, which is attractive because of its extremely low cost price, does not exhibit a good selective action with respect to the zincate ions. On the other hand, its reliability is limited owing to its susceptibility to deterioration by oxygen.

Separators consisting of a polyamide felt and cellulose have also been proposed in connection with cadmium-nickel batteries. However, cellulose does not hold up well in an alkaline electrolyte and it is very much affected by the presence of oxygen.

SUMMARY OF THE INVENTION

An object of the present invention is to obviate such disadvantges and to provide a battery in which the separator has both a good selective action and wears well in an alkaline medium, even in the presence of oxygen. A battery of this type will retain its recharging properties for an increased length of time, while providing an excellent electrical output.

The invention thus relates to an alkaline battery comprising within a container, an electrolyte, a negative electrode and a positive electrode separated by a separator consisting of a membrane permeable to the electrolyte and impermeable to the ions emitted by the negative electrode and to the gaseous oxygen. Two compartments communicating solely by way of this diaphragm, are thus created. The battery is characterized in that the separator is made of a partially reticulated polyvinyl acetal produced by the reaction of at least one aldehyde on polyvinyl alcohol.

The invention also relates to a process for the manufacture of the separator used in the battery according to the invention.

It is generally known that the term "acetal" refers to the result of the reaction of an aldehyde and an alcohol. Two alcohol functions, preferably on the same chain, are joined by the aldehyde molecule, eliminating water.

It is obviously possible to obtain various acetals from the same alcohol, depending on the aldehyde or aldehydes used. Certain polyvinyl acetals, i.e., acetals obtained from polyvinyl alcohol are used in the manufacture of garments. This applies to polyvinyl butyral.

The acetal for producing the above-mentioned separator is obtained by the action of at least one aldehyde on a polyvinyl alcohol. An anti-oxidizing agent is preferably incorporated in this separator for the purpose of increasing its resistance to oxygen.

The mechanical resistance of the separator is increased by partial reticulation, i.e., by creating links between the polyvinyl chains. These links are produced at the position of the alcohol functionality of polyvinyl alcohol, to which the above-mentioned acetal corresponds This reticulation may be facilitated by a linking agent such as a diacid, each acid function of which reacts with an alcohol function to produce an ester function. The number of ester functions is between 10 and 0.1% of that of the acetal functions, i.e., the reticulation is very partial.

Various embodiments of the invention will now be described with reference to the accompanying figures, which are provided by way of non-limitative examples.

DESCRIPTION OF THE PREFERRED EMBODIMENTS

Figure 1:
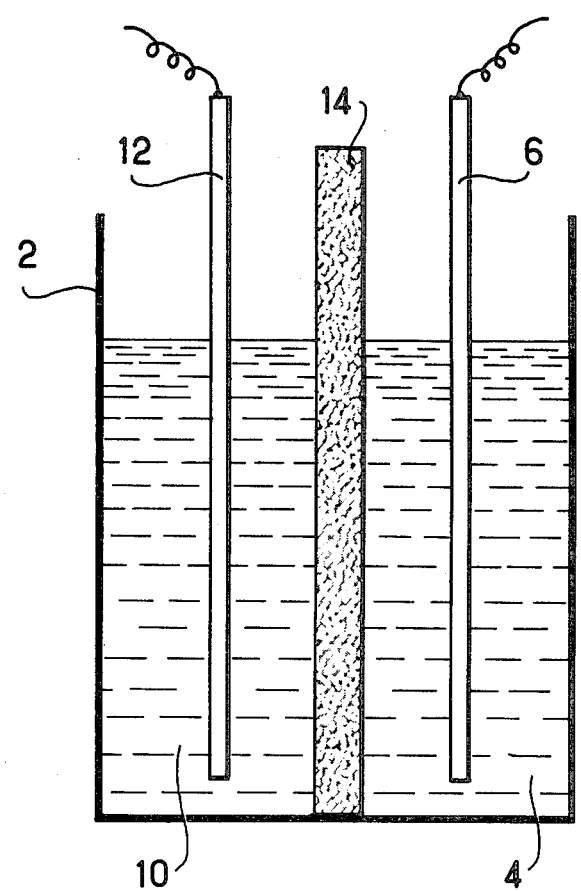
FIG. 1 shows a container containing an aqueous potash solution and a negative and a positive electrode separated by a separator.

FIG. 1 shows a container 2 containing an aqueous potash solution in which the concentration is equal to eight times the normal concentration. A negative compartment 4 contains a negative electrode 6, the active material of which is, for example, zinc. The electrode 6 is attached to an unchangeable, electronically conductive support (not shown). A positive compartment contains an positive electrode 12, the active material of which is, for example, silver oxide. This active substance is attached to an unchangeable, electronically conductive support (not shown).

The negative compartment 4 is separated completely from the positive compartment 10 by a separator 14, constituted according to the invention of a partially reticulated polyvinyl acetal. A separator of this type possesses remarkable properties (an excellent selective action with respect to the zincate ions, low electrical resistance). Its cycling ability is also much superior to that of cellophane. It will also be noted that this separator has a low cost price considering the cost of polyvinyl alcohol. This alcohol will be designated hereafter by the capital letters P.V.A.

The accumulator according to the invention was described above in the charged state. In the totally discharged state, the positive electrode comprises metallic silver instead of the silver oxide, and the zinc electrode is dissolved.

A process for the manufacture of the separator according to the example will now be described by way of example.

(1) The preparation of a polyvinyl acetal film having the qualities described above necessitates the use of a P.V.A. having the highest degree of polymerisation and the lowest ester value possible.

(2) The P.V.A. is converted into an acetal with the aid of an aldehyde, for example, formaldehyde, by the reaction:

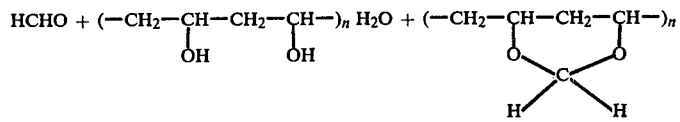

This acetalization may be produced by formaldehyde and preferably by dimethylolurea. This reaction necessitates the use of an acid catalyst, for example, ammonium chloride, sulphuric acid, phosphoric acid.

(3) A diacid, for example, oxalic acid, is added to the reacting mixture undergoing acetalization. The two functions of the oxalic acid act on the alcohol functions of two chains. A greater stability of the polymer is thus obtained and the swelling in the potash solution is inhibited. This reticulation should not be taken too far or the separator would become impermeable to water.

(4) It is advisable to incorporate traces of anti-oxidizing agents to improve the stability of the separator in the potash in the presence of oxygen. The anti-oxidizing agents are intended to fix the dissolved oxygen in the potash. These anti-oxidizing agents are, for example, alkylphenols (4 anilino phenol,4-4' methylene bis, 2.6 ditertiary butyl phenol) or amine derivatives (para-phenyl diamine, di beta naphthyl para-phenylene diamine), or quinone derivatives (hydroquinone parabenzoquinone).

By way of example, the mixture for producing a separator may be constituted as follows:

| P.V.A. | 15 | g |
| Distilled water | 200 | g |
| Isopropyl alcohol | 25 | g |
| Dimethylolurea | 1.5 | g |
| NH$_4$Cl | 0.75 | g |
| Anti-oxiding agent | 0.15 | g |

-continued

| Oxalic acid | 0.75 g |
|---|---|

In this mixture, the isopropyl alcohol is intended to facilitate the process of rendering the P.V.A. into a solution in water. The procedure is as follows:

(a) The 15 g P.V.A. are incorporated in the isopropyl alcohol. This mixture is introduced cold into the water, while stirring. The mixture is heated until it almost reaches the boiling point (95° C.) and a dissolution is complete.

(b) The various reagents are introduced:
dimethylolurea
NH$_4$Cl
oxalic acid
anti-oxidizing agent
and the mixture is stirred until dissolution is complete.

(c) The mixture is poured onto plates of glass. It is allowed to dry at ambient temperature and protected from dust for ca. 72 hours. The films are removed from their support.

(d) A thermal treatment is carried out. This treatment is intended to terminate the acetalization process, initiated cold. It also creates ether oxide links between the chains and improves durability in the potash.

To avoid oxidation of the membrane the thermal treatment must be carried out in an inert atmosphere, for example, under azote. The membrane is mounted between two sheets of filter paper to absorb the humidity released during the treatment, and the entire arrangement is held between two metal plates to prevent deformation of the film.

The temperature may vary between 120° C. and 250° C. (above this temperature the P.V.A. will decompose). The best results are obtained starting from a two hour treatment at 180° C. In the main, this treatment at between 170° and 185° C. can last for 1 to 3 hours.

(e) Before being mounted in a generator it is essential to impregnate the membrane with distilled water. The potash is added gradually until the desired concentration is obtained.

(f) If the positive electrode consists of silver oxide, which could be reduced by the non-combined aldehyde remaining inside the separator, it is advisable not to use an antioxidizing silver to carry out a final oxidation treatment in an aqueous medium.

This oxidation treatment must be carried out in such a manner as to avoid oxidizing the acetal. It is possible to use an aqueous solution, oxygenated to 3% at room temperature, or a potassium permanganate solution diluted in the presence of potash at a normal concentration.

This careful oxidation treatment may be replaced by a neutralization treatment of the aldehydes by ammonia or a specific reagent of the aldehydes. A treatment of this nature can take place cold and is also compatible with the presence of antioxidizing agents.

Another method of producing a separator according to the invention is substantially similar to that which has been described, apart from the fact that stage (c) is carried out in the following manner:

(C) The film is formed with the solution and allowed to dry at ambient temperature, protected from dust. To make this membrane it is preferable to reinforce it with a polyamide felt. Two methods of procedure may be followed:

The felt may be saturated in the P.V.A. bath. The felt is saturated several times until a continuous, homogeneous membrane without any open pores, is obtained. It is necessary for the P.V.A. to be solidified between two successive saturations by evaporation of water at ambient temperature.

A spray gun may be used to make the application. Once again, several coatings are required to obtain a separator having the desired qualities.

In both cases, the utmost care must be taken to ensure that the polyamide felt is completely clean as the slightest trace of grease will prevent the P.V.A. from adhering well to the polyamide fibers.

It is also possible to produce a separator in the manner described above, using the following composition:

| P.V.A. | 15 | g |
| Distilled water | 200 | g |
| Isopropyl alcohol | 25 | g |
| Dimethylolurea | 1.5 | g |
| Para-anisaldehyde | 0.15 | g |
| $NH_4Cl$ | 0.75 | g |
| Anti-oxidizing agent | 0.15 | g |
| Oxalic acid | 0.75 | g |

In this case the separator has an excellent thermal behavior.

The Applicant has also found that by replacing, at least partially, the hydroxyl radicals of the polyvinyl alcohol, eliminated as a result of the acetalization reaction with the aldehydes, by hydroxyl radicals substituted on the nucleus of the aromatic aldehyde, it is possible to obtain a separator, which, in addition to the advantages mentioned above, also possesses excellent absorbent qualities with respect to the electrolyte, and a lower electrical resistance.

These hydroxyl radicals may be applied by a phenol function, an acid function, a sulphonyl function, or by several of these functions, irrespective of whether the functions on one nucleus are identical, or not.

Accordingly, another separator may be composed as follows:

| P.V.A. | 15 | g |
| Distilled water | 200 | g |
| Isopropyl alcohol | 25 | g |
| Dimethylolurea | 1.5 | g |
| Salicylic aldehyde | 0.2 | g |
| $NH_4Cl$ | 0.75 | g |
| Anti-oxidizing agent | 0.15 | g |
| Oxalic acid | 0.75 | g |

The salicyclic aldehyde may also be replaced by other aromatic aldehydes also comprising a hydroxyl radical, either a carboxylic acid or a sulphonic acid.

Figure 2:
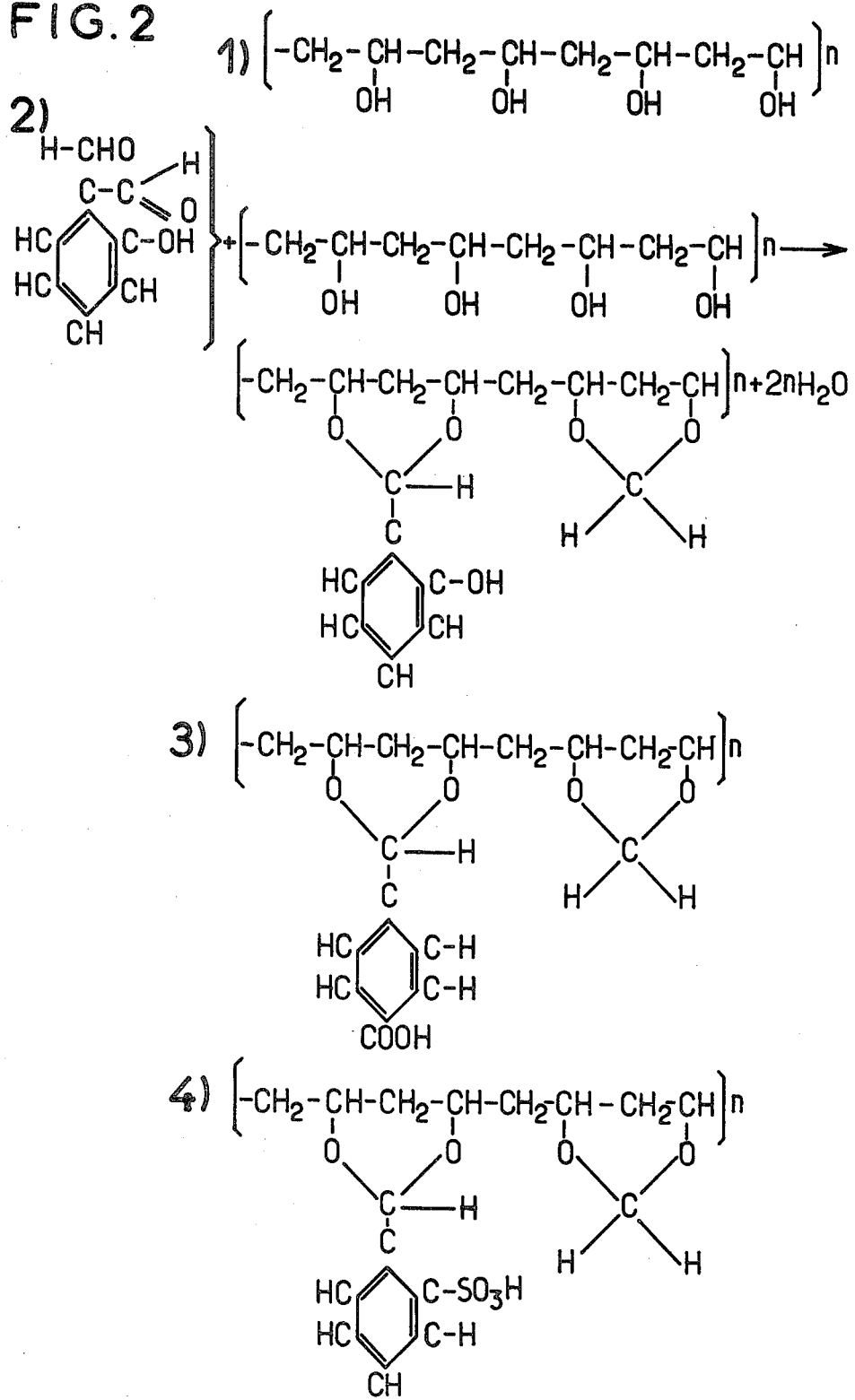
FIG. 2 illustrates reactions for replacing salicyclic aldehyde by other aromatic aldehydes.

FIG. 2 illustrates such reactions.

In the first instance, the formula developed (1) represents the polyvinyl alcohol molecule.

Illustrated under (2) is the reaction for producing polyvinyl acetal from formaldehyde and an aromatic aldehyde comprising a radical hydroxyl OH—a phenol function, such an aldehyde being salicyclic aldehyde.

Thus it will be seen that 4 OH radicals are replaced by the phenolic OH.

The reference (3) shows an acetal structure obtained by using 4 carboxy-benzaldehyde $C_6H_4CHOCOOH$ together with the formaldehyde. In this case the OH radical is provided by an acid function.

Lastly, (4) represents an acetal obtained by causing orthobenzaldehyde sulphonic acid $C_6H_4CHOSO_3H$ to react with formaldehyde. In this case, the OH radical is integrated with a a sulphonyl function.

The aromatic aldehyde may obviously comprise several functions on the nucleus. These functions may be identical or different, provided that they comprise a hydroxyl radical.

For example, it is possible to use a polyphenolic or polyacid aldehyde. In concrete terms, reference (4) discloses an acetal comprising two $—SO_3H$ functions disposed respectively in ortho and para positions with respect to the aldehyde function. This acetal is obtained by using benzaldehyde-2-4-disulphonic acid together with the formaldehyde.

In this way it is possible to obtain separators having hydrophilic qualities as well as variable electrical resistances.

The invention is obviously not limited to the embodiments described and represented, which are provided by way of example only. More particularly, it is possible to modify certain details, change certain compositions and replace certain products or means by equivalent products and means, without departing from the scope and framework of the invention.

What is claimed is:

1. An alkaline battery having a zinc electrode or cadmium-nickel electrodes, said battery containing within a container an electrolyte, a negative electrode and a positive electrode separated by a separator consisting of a membrane permeable to said electrolyte and impermeable to the ions emitted by said negative electrode and also to gaseous oxygen, thus creating two compartments communicating solely by way of this membrane, said battery being characterized in that the separator comprises a partially reticulated polyvinyl acetal produced by the acetalization action of dimethylolurea on polyvinyl alcohol and wherein the separator has been subjected to a thermal treatment to terminate the acetalyzation process and to create ether oxide links between polymer chains and the partially reticulated polyvinyl acetal.

2. A battery according to claim 1, characterized in that an anti-oxidizing agent is incorporated in said acetal.

3. A battery according to claim 1, characterized in that aromatic aldehyde is also used along with the dimethylolurea to form the partially reticulated polyvinyl acetal.

4. A battery according to claim 3, characterized in that, the aromatic aldehyde is at least an anisaldehyde.

5. A battery according to claim 4, characterized in that said anisaldehyde is para-anisaldehyde.

6. A battery according to claim 1 characterized in that said negative electrode consists of a material containing zinc; the positive electrode consisting of a material containing silver oxide.

7. A battery according to claim 1, characterized in that said negative electrode consists of a material containing cadmium; the positive electrode consisting of a material containing nickel.

8. A battery according to claim 1 characterized in that the polyvinyl alcohol is partially reticulated by oxalic acid linked to the polyvinyl chains at the alcohol functions of the polyvinyl alcohol corresponding to said acetal.

9. The battery according to claim 8 characterized in that the number of ester functions corresponding to the oxalic acid linkages is between 10 and 0.1% of the acetal functions.

* * * * *